(12) United States Patent
Klein

(10) Patent No.: US 6,233,627 B1
(45) Date of Patent: *May 15, 2001

(54) PROCESSOR WITH INTERNAL REGISTER FOR PERIPHERAL STATUS

(75) Inventor: Dean A. Klein, Eagle, ID (US)

(73) Assignee: Micron Technology, Inc., Boise, ID (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/131,446

(22) Filed: Aug. 10, 1998

(51) Int. Cl.[7] .................. G06F 13/24; G06F 13/00; G06F 9/48
(52) U.S. Cl. ................. 710/19; 710/1; 710/268; 710/266; 710/48; 711/119; 711/141
(58) Field of Search ................. 710/1, 28, 48, 710/50, 261, 19, 266, 268, 264; 340/825; 711/119, 141, 200; 709/214, 253; 714/43; 370/464; 327/1; 712/244

(56) References Cited

U.S. PATENT DOCUMENTS

| | | | |
|---|---|---|---|
| 3,881,174 | * 4/1975 | Barnich . | |
| 3,996,561 | 12/1976 | Kowal | 340/172.5 |
| 4,024,505 | * 5/1977 | Sperling . | |
| 4,090,238 | 5/1978 | Russo | 364/200 |
| 4,240,140 | 12/1980 | Stafford et al. | 364/200 |
| 4,326,249 | 4/1982 | Godsey | 364/200 |
| 4,768,149 | 8/1988 | Konopik et al. | 364/200 |
| 5,119,496 | 6/1992 | Nishikawa | 395/725 |
| 5,578,953 | 11/1996 | Nuckols | 327/215 |
| 5,608,873 | 3/1997 | Feemster | 395/200.08 |
| 5,678,025 | 10/1997 | Ghori et al. | 395/462 |
| 5,745,788 | 4/1998 | Wallace et al. | 395/839 |
| 5,754,884 | 5/1998 | Swanstrom | 395/842 |
| 5,797,038 | * 8/1998 | Crawford et al. . | |
| 5,848,237 | * 12/1998 | Cross et al. . | |
| 5,852,743 | 12/1998 | Yeh | 395/838 |
| 5,905,913 | * 5/1999 | Garrett et al. . | |

OTHER PUBLICATIONS

IBM Technical Disclosure Bulletin entitled "Interrupt Service Allocation Technique for the Micro Channel Bus". vol. 33, No. 1A, Jun. 1990, pp. 298–304.

* cited by examiner

*Primary Examiner*—Gopal C. Ray
(74) *Attorney, Agent, or Firm*—Park & Vaughan LLP

(57) ABSTRACT

One embodiment of the present invention provides an apparatus within a computer system that maintains status information for peripheral devices in a status register, which is located within a central processing unit in the computer system. In this embodiment, a peripheral device updates the status register if its status changes by performing a bus master operation to transfer status information to the status register. It then generates an interrupt to indicate to a processor that it requires servicing. When the processor services the interrupt, the processor performs an internal read of the status register to determine which peripheral device requires processing. No time-consuming polling of peripheral devices is required to determine the status of the peripheral devices. Thus, one embodiment of the present invention provides an apparatus within a central processing unit that maintains status information for peripheral devices in a status register. This apparatus includes a communication channel coupled to a central processing unit and a number of peripheral devices. A status register is coupled with the central processing unit to store status information for the peripheral devices. An updating circuit is located within the core logic unit and is coupled between the communication channel and the status register. This updating circuit includes a mechanism to update the status register in response to signals containing status information received from the peripheral devices through the communication channel.

8 Claims, 8 Drawing Sheets

PROCESSOR WITH INTERNAL REGISTER FOR PERIPHERAL STATUS

RELATED APPLICATIONS

The subject matter of this application is related to the subject matter in the following U.S. patent applications: Ser. No. 09/131,447, filed Aug. 10, 1998, pending; Ser. No. 09/131,497, filed Aug. 10, 1998, pending; and Ser. No. 09/131,922, filed Aug. 10, 1998, pending.

BACKGROUND

1. Field of the Invention

The present invention relates to peripheral devices in computer systems, and more particularly to a processor with an internal register for maintaining status information for peripheral devices in a computer system.

2. Related Art

Computer systems typically include a central processing unit that is coupled to and communicates with a plurality of peripheral devices, typically through a computer system bus. These peripheral devices can include: data storage devices, such as disk drives and tape drives; data input devices, such as a keyboard or a mouse; data output devices, such as a video display or an audio speaker; and communication devices, such as a network interface controller. A peripheral device frequently requires attention from the central processing unit in order to transfer data between the central processing unit and the peripheral device, or to otherwise command and manipulate the peripheral device. This attention is typically triggered by an interrupt, which the peripheral device sends to the central processing unit on order to "interrupt" normal processing by the central processing unit. During an interrupt, the central processing unit temporarily suspends normal processing and executes a piece of code known as an "interrupt service routine" to perform the required service for the peripheral device. Once the interrupt service routine is complete, the central processing unit resumes normal processing.

Many computer systems use a shared interrupt architecture, in which a plurality of peripheral devices can activate the same interrupt signal. One commonly-used shared interrupt architecture is a daisy-chained structure, in which peripheral devices are "chained" together through one or more interrupt lines. Any peripheral device in the chain can generate an interrupt signal, and this interrupt signal is passed through the chain until it ultimately reaches the central processing unit. In another commonly-used shared interrupt architecture, peripheral devices share a common interrupt bus line; peripheral devices can signal an interrupt to the processor by asserting this interrupt bus line.

A shared interrupt architecture has certain advantages. It is very simple; typically requiring only a small number of signal lines to carry interrupt signals. It is also expandable, typically allowing additional peripheral devices to be integrated into a computer system without requiring additional lines for interrupt signals.

However, a shared interrupt architecture suffers from a major disadvantage. It requires the central processing unit to determine which peripheral device requires processing. This is because all of the peripheral devices generate the same interrupt signal, and the central processing unit cannot tell from the interrupt signal which peripheral devices require servicing. Hence, the central processing unit must typically "poll" the peripheral devices in order to determine which peripheral devices require servicing.

This polling process can be quite time-consuming. The central processing, unit may have to poll every peripheral device in the computer system, even though only one peripheral device typically requires servicing at any given time. Polling reduces CPU efficiency, because the CPU must perform multiple bus transactions to poll the peripheral devices, and each bus transaction can require a large number of CPU cycles in a high performance computing system. Polling also ties up the peripheral bus with a large number of polling accesses. Furthermore, polling increases the time required for servicing an interrupt. This may create problems for peripheral devices that require servicing in a timely manner. For example, a network interface controller may require immediate servicing to prevent a buffer of incoming data from overflowing. This immediate servicing may be delayed by polling.

What is needed is a system for retrieving status information from peripheral devices in a shared interrupt architecture that reduces the amount of time and bus activity required to determine the status of the peripheral devices.

SUMMARY

One embodiment of the present invention provides an apparatus within a computer system that maintains status information for peripheral devices in a status register, which is located within a central processing unit in the computer system. In this embodiment, a peripheral device updates the status register if its status changes by performing a bus master operation to transfer status information to the status register. It then generates an interrupt to indicate to a processor that it requires servicing. When the processor services the interrupt, the processor performs an internal read of the status register to determine which peripheral device requires processing. This is a very fast operation because the status register is internal to the CPU. No time-consuming polling of peripheral devices is required to determine the status of the peripheral devices. Thus, one embodiment of the present invention provides an apparatus within a central processing unit that maintains status information for peripheral devices in a status register. This apparatus includes a communication channel coupled to a central processing unit and a number of peripheral devices. A status register is coupled with the central processing unit to store status information for the peripheral devices. An updating circuit is located within the core logic unit and is coupled between the communication channel and the status register. This updating circuit includes a mechanism to update the status register in response to signals containing status information received from the peripheral devices through the communication channel.

Another embodiment of the present invention includes a special-purpose processor instruction that reads the status register and automatically branches to the appropriate interrupt service routine based upon the contents of the status register.

In another embodiment of the present invention, the communication channel includes a computer system bus. In a variation on this embodiment, the communication channel includes a processor-to-memory bus. In a further variation on this embodiment, the communication channel carries signals for maintaining coherency between multiple caches in the computer system.

In another embodiment of the present invention, the computer system includes a plurality of central processing units and a plurality of status registers coupled between the central processing units and the communication channel.

In another embodiment of the present invention, the computer system includes a wire-ORed interrupt structure that couples the peripheral devices to the central processing unit through a core logic unit.

Another embodiment of the present invention can be characterized as an apparatus within a processor for updating a status register to indicate changes in the status of peripheral devices in a computer system. This apparatus includes a plurality of address inputs coupled to address lines of a bus, wherein the bus is coupled to the peripheral devices. This apparatus also includes an address detecting circuit coupled to a set of higher order bits in the plurality of address inputs. This address detecting circuit is configured to detect an address in a reserved range of addresses specified by the set of higher order bits. The apparatus additionally includes a decoder circuit coupled to a set of lower order bits in the plurality of address inputs. This decoder circuit detects references to particular addresses in the reserved range of addresses. A status register is coupled to a set of outputs from the decoder circuit, so that a reference to a particular address in the reserved range of addresses by a peripheral device feeds through the decoder and updates status information for the peripheral device in the status register. The status register also includes outputs coupled to a central processing unit so that the status register can be read by the central processing unit.

In a variation on this embodiment, the address detecting circuit includes a decoder. In another variation, the address detecting circuit includes a comparator.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Overview of a First Embodiment of Invention

Figure 1:
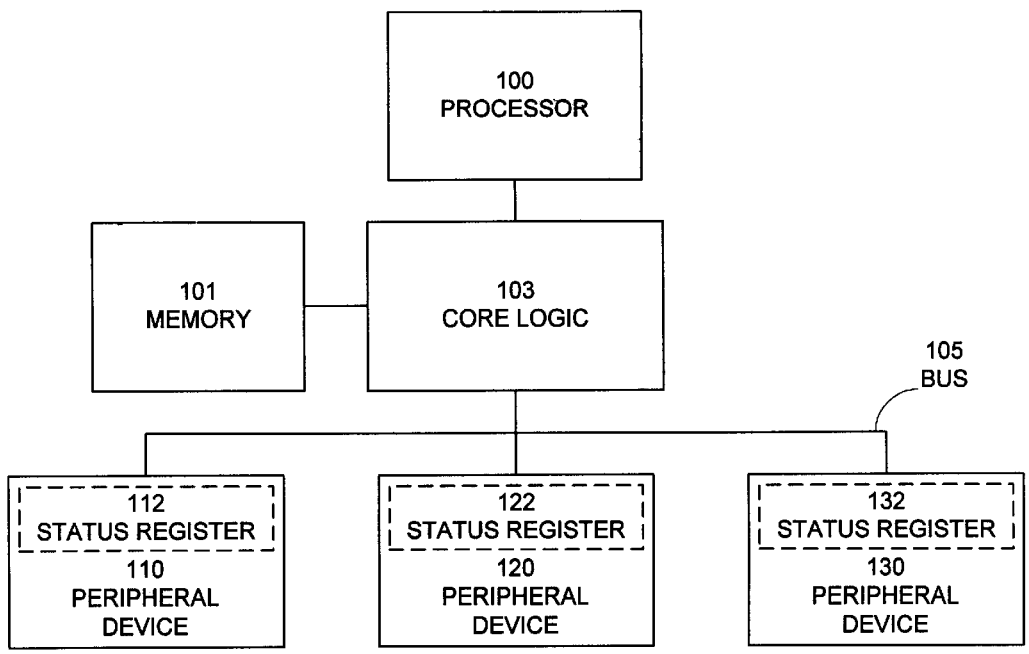
FIG. 1 illustrates a prior art computer system, wherein a processor 100 reads status registers 112, 122 and 132 located at respective peripheral devices 110, 120 and 130.

FIG. 1 illustrates a prior art computer system, wherein a processor 100 reads status registers 112, 122 and 132, located at respective peripheral devices 110, 120 and 130. Processor 100 is coupled to memory 101 and bus 105 through core logic unit 103. Processor 100 can access peripheral devices 110, 120 and 130 through bus 105. In response to an interrupt, processor 100 polls status registers 112, 122 and 132 in order to determine which of peripheral devices 110, 120 and 130 require processing. This polling requires multiple operations over bus 105.

Figure 2:
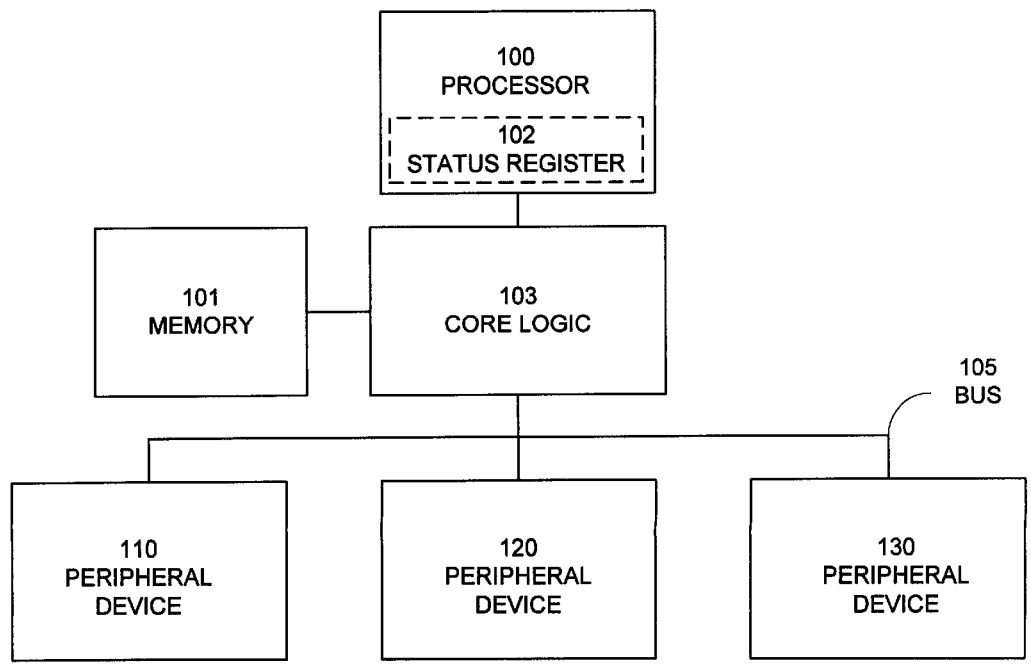
FIG. 2 illustrates a computer system including a processor 100 with an internal status register 102 for storing the status of peripheral devices in accordance with an embodiment of the present invention.

FIG. 2 illustrates a computer system including a processor 100 with an internal status register 102, for storing the status of peripheral devices in accordance with an embodiment of the present invention. As in the system illustrated in FIG. 1, processor 100 is coupled to memory 101 and bus 105 through core logic unit 103. Processor 100 can access peripheral devices 110, 120 and 130 through bus 105.

However, the embodiment illustrated in FIG. 2 differs in a number of respects from the system illustrated in FIG. 1. In FIG. 2, processor 100 references status register 102 during interrupts to determine the status of peripheral devices 110, 120 and 130. This is a very fast operation because status register 102 is internal to peripheral processor 100. A reference to status register 102 by processor 100 requires no accesses across bus 105 to poll peripheral devices 110, 120 and 130.

Instead, peripheral devices 110, 120 and 130 are responsible for updating status information in status register 102. This updating only needs to occur when the status of a peripheral device changes. In order to update a status register, a peripheral device, such as peripheral device 110, writes to a reserved memory location in the address space of bus 105. No memory actually resides in this reserved address space. Instead, logic attached to the status register intercepts references to these reserved locations, and uses these references to appropriately update status registers to reflect the indicated change in status of a peripheral device.

In general processor 100 may be any type of computational engine for a computer system. This includes, but is not limited to, mainframe processors, microprocessors, and micro-controllers. Bus 105 may be any type of communication channel for coupling a processor to other devices in a computer system, including peripheral devices, memory devices and other processors. This includes, but is not limited to, buses such as the PCI bus, and buses that include signals to maintain coherency between multiple caches in a shared memory multiprocessor system. Peripheral devices 110, 120 and 130 may be any type of peripheral devices that can coupled to a computer system. These include, but are not limited to: data storage devices, such as disk drives and tape drives; data input devices, such as a keyboard or a mouse; data output devices, such as a video display or an audio speaker; and communication devices, such as a network interface controller.

Figure 3:
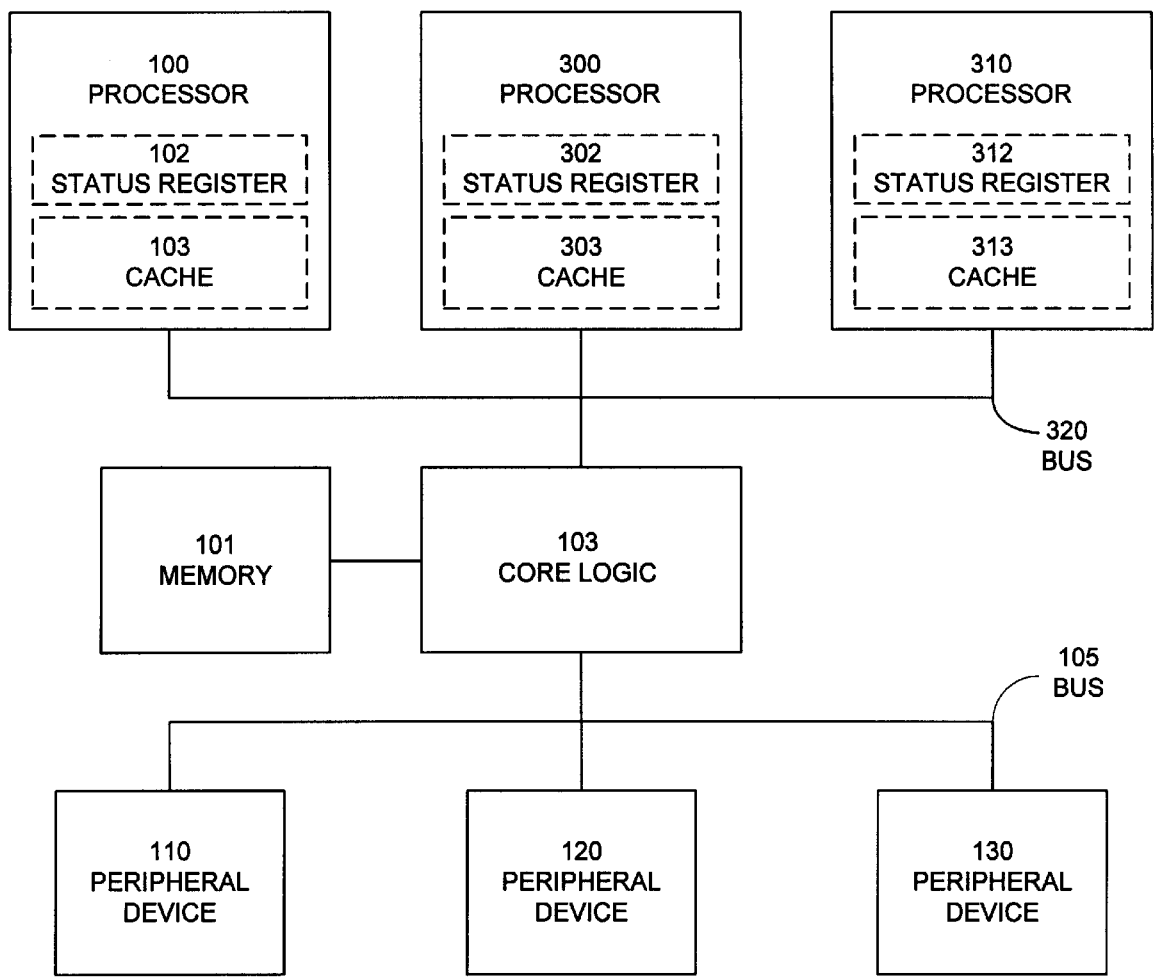
FIG. 3 illustrates a computer system including multiple processors with internal status registers for storing the status of peripheral devices in accordance with an embodiment of the present invention.

FIG. 3 illustrates a computer system including multiple processors with internal status registers for storing the status of peripheral devices in accordance with an embodiment of the present invention. In this embodiment, processors 100, 300 and 310 include caches 103, 303 and 313, respectively. Caches 103, 303 and 313 store copies of code and data from memory 320 for use by processors 100, 300 and 310 respectively. Processors 100, 300 and 310 are coupled bus 320, as is core logic unit 103. Core logic unit 103 couples bus 320 to memory 101 and bus 105. Peripheral devices 110, 120 and 130 are coupled to bus 105.

In this embodiment, bus 320 includes signals to maintain coherency between data stored memory 320 as well as copies of the data stored in caches 103, 303 and 313. Coherence is typically maintained by invalidating an entry in a cache if a copy of the data contained in the entry is modified in another cache or in memory 320. Processors 100, 300 and 310 use "snoop logic" to "snoop" or listen in to a set of signals on bus 320 to determine whether to invalidate an entry in a local processor cache.

In this embodiment, processors 100, 300 and 310 additionally include status registers 102, 302 and 312, respectively, which store status information regarding peripheral devices 110, 120 and 130. In this embodiment, status registers 102, 302 and 312 operate by monitoring the signals monitored by the "snoop logic" to invalidate cache entries. In order to update a status register, a peripheral device, such as peripheral device 110, writes to a reserved memory location in the address space of bus 105.

In general, updating a location in memory 101 causes an invalidation signal on bus 105 to invalidate any copies of the data stored in the memory location that may exist in caches 103, 303 and 313. Since no memory actually resides in this reserved address space, the invalidation signals always cause a cache miss. Logic attached to the status register intercepts references to these reserved locations, and uses these references to appropriately update status registers to reflect the indicated change in status of a peripheral device. This process is described in more detail with reference to FIGS. 4–11 below.

Description of Computer System

Figure 4:
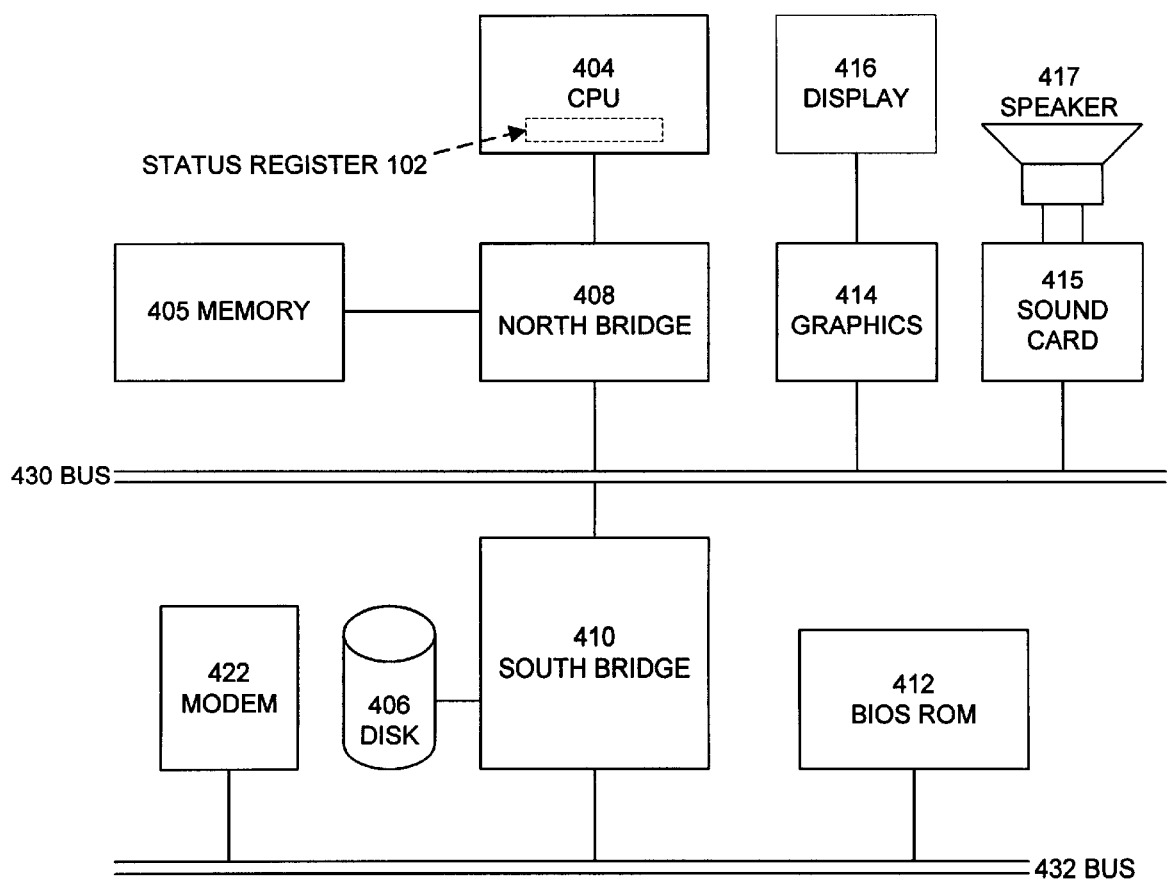
FIG. 4 illustrates the internal structure of a processor including alternative locations for status register 102 in accordance with an embodiment of the present invention.

FIG. 4 illustrates the internal structure of a computer system processor including status register 102 in accordance with an embodiment of the present invention. In the illustrated embodiment, CPU 404 is coupled through north bridge 408 to memory 405 and to bus 430. Memory 405 can be any type of semiconductor memory that can be used in a computer system. Bus 430 can by any type of computer system bus. In one embodiment, bus 430 includes a PCI bus. Bus 430 is coupled to graphics module 414, which processes graphical images for output to display 416. Bus 430 is additionally coupled to sound card 415, which generates audio signals. Sound card 415 is coupled to speaker 417, so that the audio signals generated by sound card 415 are outputted through speaker 417.

In the illustrated embodiment, CPU 404 is additionally coupled with south bridge 410 through north bridge 408. North bridge 408 and south bridge 410 form part of the "core logic" for the computer system. This core logic ties together and coordinates operations of components in the computer system. South bridge 410 is coupled with disk 406, which may include any type of non-volatile storage device. This includes, but is not limited to, magnetic, optical, magneto-optical and flash memory storage devices. South bridge 410 is also coupled with bus 432, which can be any type of computer system bus. In one embodiment, bus 432 includes an ISA bus. Bus 432 allows CPU 404 to communicate with BIOS ROM 412 and modem 422, which are coupled to bus 432. Modem 422 may be any type of modem through which a computer system can communicate across a telephone line.

FIG. 4 illustrates status register 102 within CPU 404 itself. In another embodiment, status register 102 may include a stand-alone register in the computer system, not within CPU 404.

Description of Status Register

Figure 5:
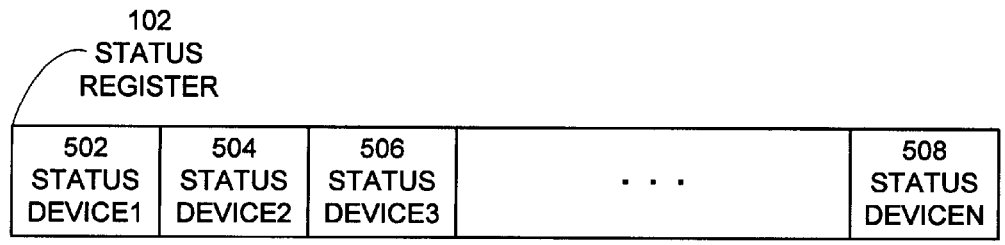
FIG. 5 illustrates the structure of status register 102 in accordance with an embodiment of the present invention.

FIG. 5 illustrates the structure of status register 102 in accordance with an embodiment of the present invention. In the illustrated embodiment, status register 102 includes a plurality of bits containing status information for peripheral devices in the computer system. These bits include, status device 1 502, status device 2 504, status device 3 506 and status device N 508. When a status bit is set, this indicates that the corresponding device requires servicing. In other embodiments of the present invention, status register 102 includes more than one bit of status information for each device. These bits contain additional status information for each device, beyond the mere fact that a particular device requires servicing. For example, the status information may specify the type of service the device requires.

Figure 6:
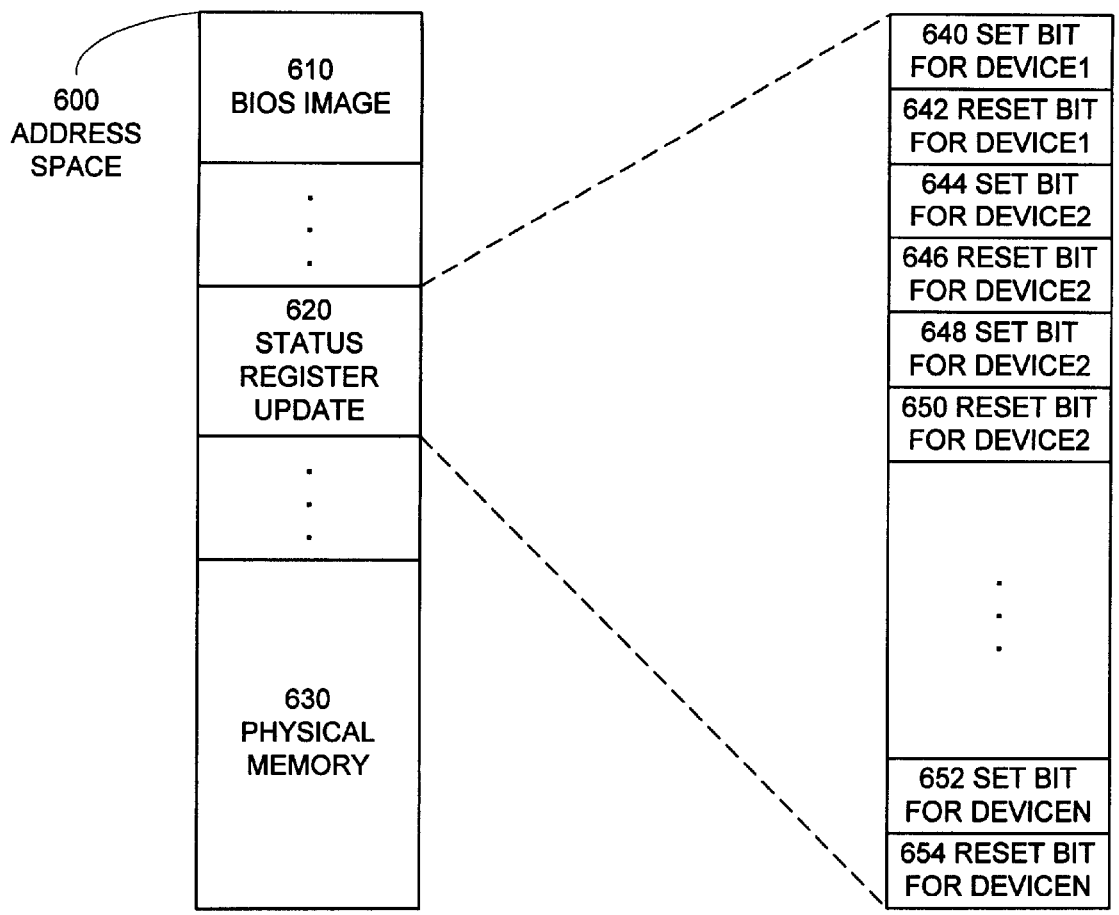
FIG. 6 illustrates how status register updating is accomplished through memory mapping in accordance with an embodiment of the present invention.

FIG. 6 illustrates how status register updating is accomplished through memory mapping in accordance with an embodiment of the present invention. In this embodiment, address space 600 is an address space for address lines on a bus, such as bus 105 from FIG. 1. Address space 600 includes a BIOS image 610 at the lower end of address space 600. BIOS image 610 contains code to implement lower-level operating system functions. Address space 600 additionally includes physical memory 630 at the upper end of address space 600. Physical memory 630 contains code and data used by a processor to execute programs. A section of address space 600, between BIOS image 610 and physical memory 630, is reserved for updating status register 102. There is no actual memory in these address locations. However, accesses to these locations update the contents of status register 102. For example, an accesses to address 640 sets the status bit for device 1 502 to indicate that device 1 requires servicing, and an access to address 642 resets bit 502 to indicate that device 1 does not require servicing. Similarly, accesses to addresses 644, 648 and 652 set status bits 504, 506 and 508, respectively, and accesses to addresses 646, 650 and 654 reset the same status bits.

Description of Status Register Locations

Figure 7:
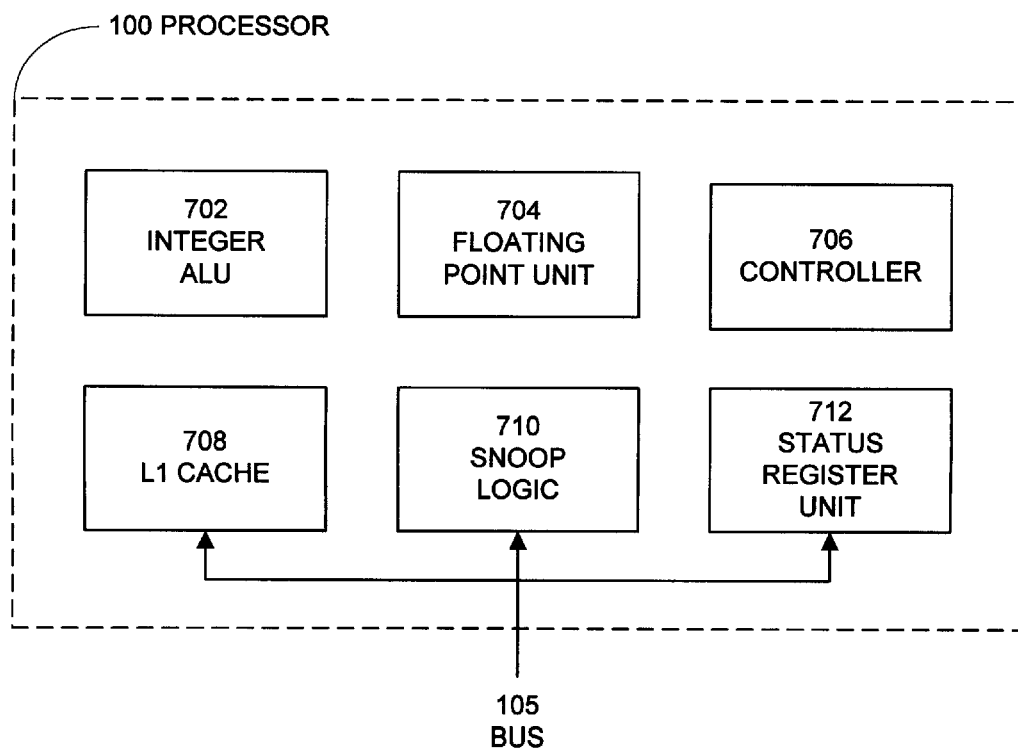
FIG. 7 illustrates some of the functional units within processor 100 in accordance with an embodiment of the present invention.

FIG. 7 illustrates some of the functional units within processor 100 in accordance with an embodiment of the present invention. In the illustrated embodiment, processor 100 includes integer ALU (arithmetic logic unit) 702 and floating point unit 704, which perform computational operations. Processor 100 also includes controller 706, which can coordinate actions of functional units within processor 100. A number of units within processor 100 are coupled to bus 105. These include L1 cache 708, which stores instructions and data used by processor 100 during computational operations. In some embodiments, L1 cache 708 includes separate instruction and data caches. Snoop logic 710 is also coupled to bus 105. Snoop logic 710 listens to signals on bus 105 that contain "snoop" information. Snoop logic 710 uses this snoop information to invalidate entries within L1 cache 708.

Bus 105 is also coupled to status register unit 712. Status register unit 712 includes a status register, such as status register 102. Status register unit 712 also listens to signals on bus 105 that contain "snoop" information, except that status register unit 712 only listens for addresses in the reserved range of addresses 620. When such an address is detected, status register unit 712 updates status register 102 appropriately as specified in FIG. 6.

Figure 8:
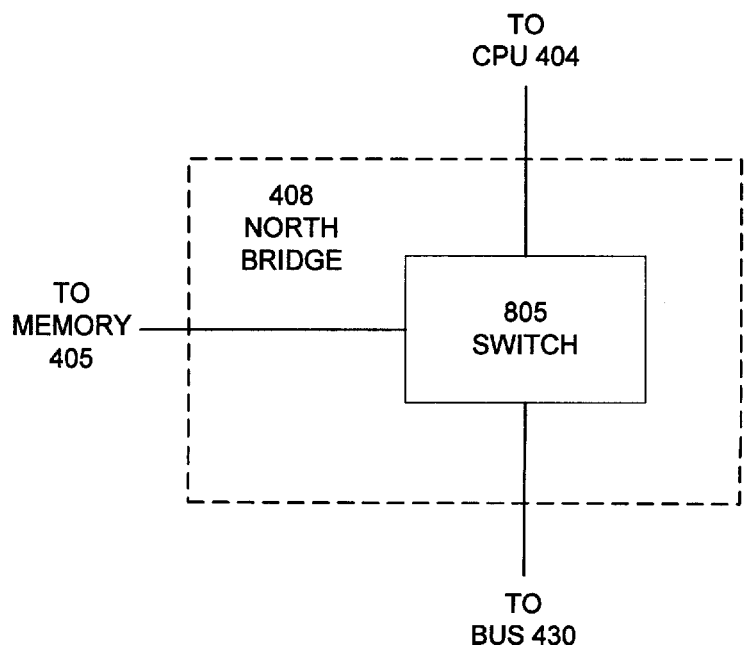
FIG. 8 illustrates some of the internal structure of north bridge 408 in accordance with an embodiment of the present invention.

FIG. 8 illustrates some of the internal structure of north bridge 408 in accordance with an embodiment of the present invention. In this embodiment, north bridge 408 includes a switch 805, which switches data between CPU 404, memory 405 and bus 430.

Description of One Embodiment of Status Register

Figure 9:
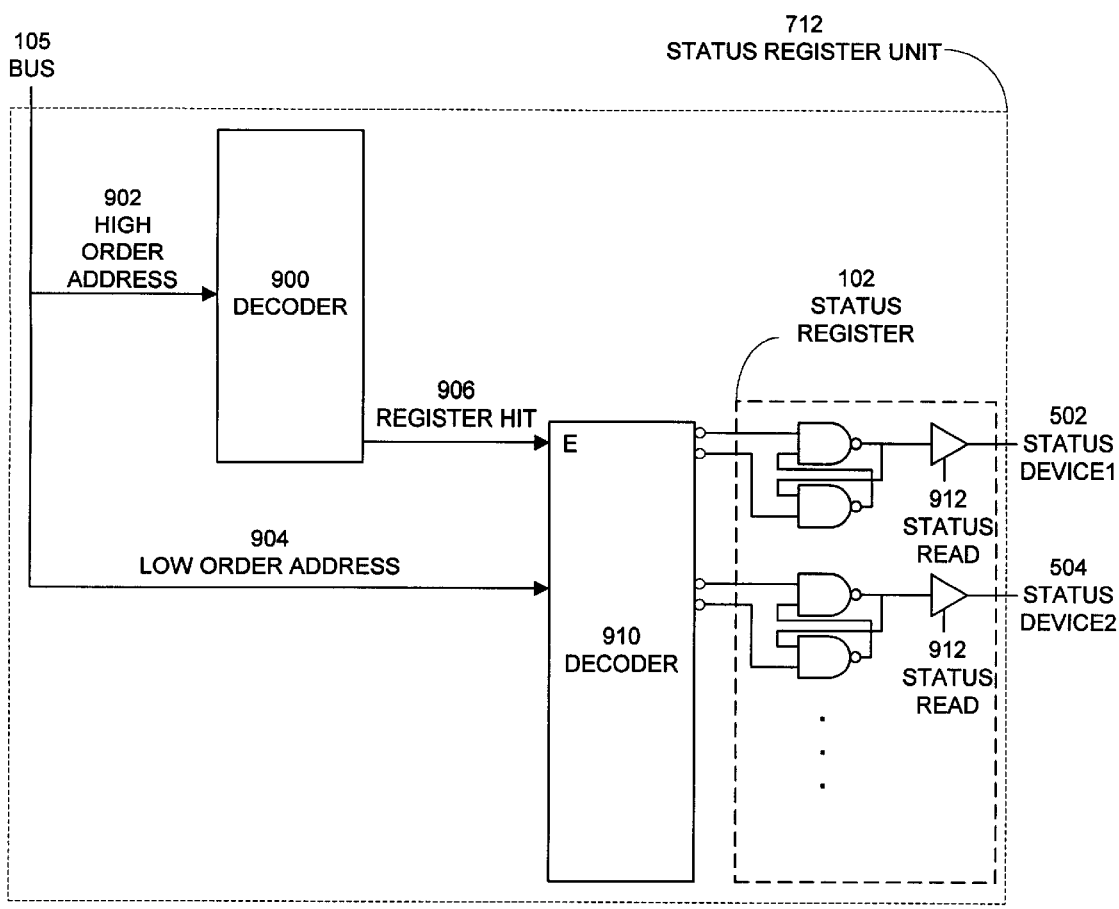
FIG. 9 illustrates part of the internal structure of status register unit 712 in accordance with an embodiment of the present invention.

FIG. 9 illustrates part of the internal structure of status register unit 712 in accordance with one embodiment of the present invention. In this embodiment, address lines from bus 105 are monitored by logic within status register unit 712 to detect references to reserved addresses 620. More particularly, high order address bits from bus 105 feed into inputs of decoder 900. If the high order address bits 902 specify an address in the reserved addresses 620, decoder 900 generates a register hit signal 906, which feeds into an enable input of decoder 910. In another embodiment, high order address bits 902 feed into a comparator circuit that performs the same address detection function. In general, any commonly known address detection circuitry can be used to detect addresses in the reserved range 620. Low order address bits 904 feed into inputs of decoder 910. These low order address bits are used to select various outputs of decoder 910. These outputs either set or reset bits in status register 102. In the illustrated embodiment, each bit of status register 102 is stored in a bistable circuit which includes two NAND gates connected circularly as shown in FIG. 9. Each NAND gate pair takes two inputs from decoder 910. If the top input is asserted low, the bit is set, and if the bottom input is asserted low the bit is reset. For example, an access to address 640 causes the top output of decoder 910 to be asserted low, which causes to corresponding bit to be asserted to a one value. In contrast, an access to address 642 causes the next lower output of decoder 910 to be asserted low, which resets the same bit. Finally, when status read signal 912 is asserted, the attached drivers are activated to read the bits out from status register 102. This embodiment illustrates one of many possible structures for status register 102. In general, any other commonly known structure for a register may be used.

Description of Operation of Status Register

Figure 10:
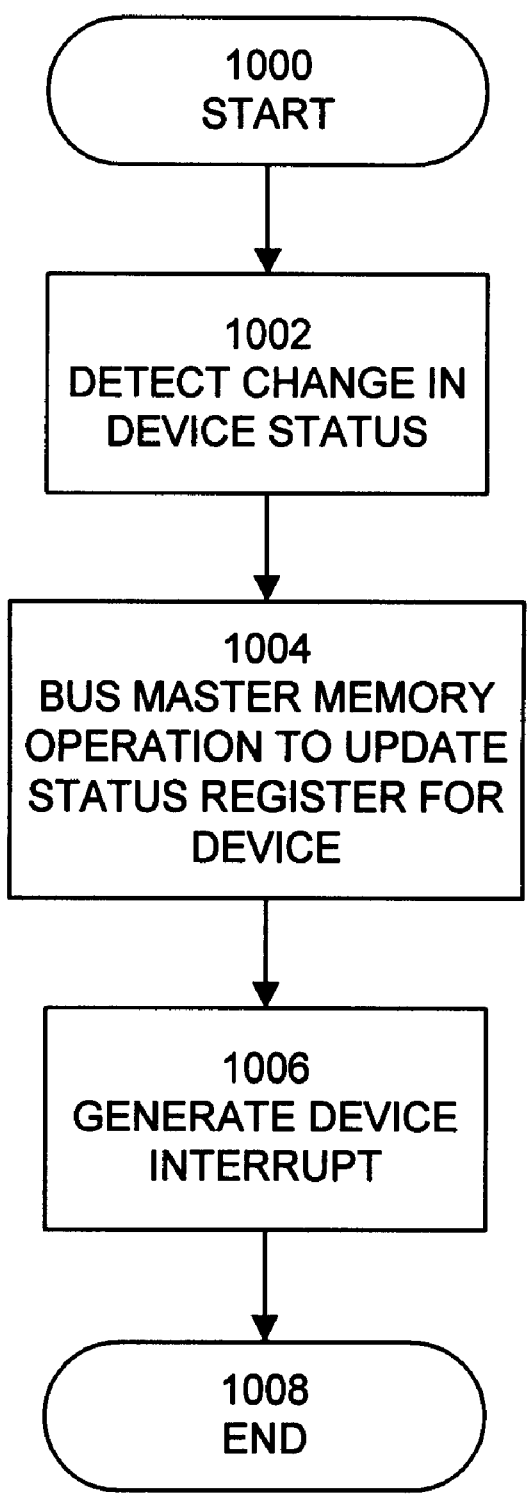
FIG. 10 is a flow chart illustrating how a peripheral device updates status register 102 in accordance with an embodiment of the present invention.

FIG. 10 is a flow chart illustrating how a peripheral device updates status register 102 in accordance with an embodiment of the present invention. In this embodiment, the peripheral device starts at state 1000 and proceeds to state 1002. In state 1002, the peripheral device detects a change its status. This change in status may indicate that some servicing is required. For example, data may be ready to be transferred the to processor 100. The peripheral device then proceeds to state 1004. In state 1004, the peripheral device performs a bus master operation on bus 105 to update the status register 102 to indicate that the device requires servicing. The peripheral device then proceeds to state 1006. In state 1006, the peripheral device generates an interrupt to indicate to processor 100 that a peripheral device requires servicing. The peripheral device then proceeds to state 1008, which is an end state.

Figure 11:
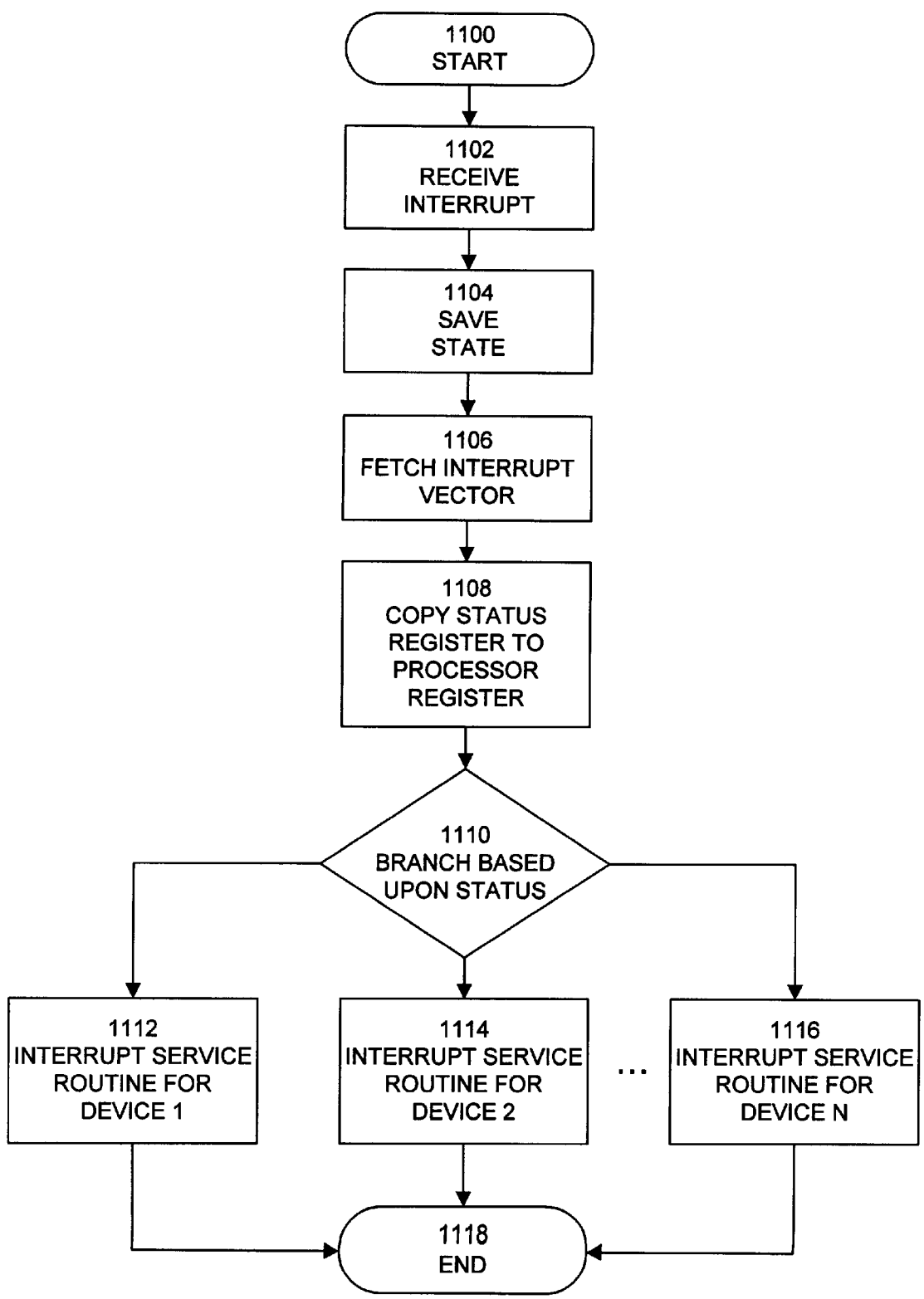
FIG. 11 is a flowchart illustrating how processor 100 uses information from status register 102 to trigger an appropriate interrupt service routine in accordance with an embodiment of the present invention.

FIG. 11 is a flowchart illustrating how processor 100 uses information from status register 102 to trigger an interrupt service routine in accordance with an embodiment of the present invention. Processor 100 starts in state 1100 and proceeds to state 1102. In state 1102, processor 100 receives an interrupt from one of the peripheral devices coupled to bus 105. Processor 100 then proceeds to state 1104, in which processor 100 saves state in order to process the interrupt. Processor 100 then proceeds to state 1106. In state 1106, processor 100 fetches interrupt instructions from the location pointed to by an interrupt vector. Processor 100 then proceeds to state 1108. In state 1108, processor 100 copies status register 102 to a processor register in order to examine the contents of status register 102. The system then proceeds to state 1110.

In state 1110, processor 100 branches based upon the contents of status register 102 to various interrupt service routines 1112, 1114 and 1116. This branching may actually require a number of instructions to test status register 102 and to perform appropriate conditional branching. In another embodiment, processor 100 includes a special instruction that automatically branches to the appropriate service routine based upon the contents of status register 102. If status register 102 indicates that device 1 requires processing, processor 100 branches to state 1112, which is the start of an interrupt service routine to service device 1. This interrupt service routine generally includes a large number of interrupt service instructions, which are not shown. After the interrupt service routine is complete processor 100 proceeds to state 1118, which is an end state. If status register 102 indicates that device 2 requires processing, processor 100 branches to state 1114, which is the start of an interrupt service routine to service device 2. After this interrupt service routine is complete, processor 100 proceeds to state 1118, which is an end state. If status register 102 indicates that device N requires processing, processor 100 branches to state 1116, which is the start of an interrupt service routine to service device N. After this interrupt service routine is complete processor 100 proceeds to state 1118, which is an end state.

The present example illustrates the case of only three interrupt service routines. In general, the system may include a large number of interrupt service routines to service all of the possible conditions for each peripheral device in the computer system.

In one embodiment of the present invention, the process of mapping peripheral devices to particular bits of status register 102, and the process of assigning particular interrupt service routines to particular peripheral devices are performed as initialization routines during system initialization. In one embodiment of the present invention, the code to perform these functions resides in a read only memory, which is read during system boot up.

Definitions

Core logic—circuitry within a computer system that interfaces a processor to a memory and a peripheral bus and performs other functions.

Snoop bus—a bus that carries signals to maintain consistency or coherency between multiple caches in a computer system including multiple processors.

The foregoing descriptions of embodiments of the invention have been presented for purposes of illustration and description only. They are not intended to be exhaustive or to limit the invention to the forms disclosed. Obviously, many modifications and variations will be apparent to practitioners skilled in the art.

What is claimed is:

1. A computer system that maintains status information for peripheral devices, comprising:

a central processing unit;

a bus coupled to the central processing unit, the bus carrying signals for maintaining coherency between multiple caches in multiple processors in the computer system;

a plurality of peripheral devices coupled to the bus;

a status register located within the central processing unit for storing status information for the plurality of peripheral devices;

a daisy-chained interrupt structure coupled between the at least one peripheral device and the central processing unit, for sending an interrupt signal to the central processing unit from the at least one peripheral device; and an updating circuit coupled between the bus and the status register, the updating circuit including a mechanism to update the status register in response to signals containing status information received through the bus from the plurality of peripheral devices.

2. The computer system of claim 1, wherein the central processing unit is located within a microprocessor chip.

3. The computer system of claim 1, further comprising:

a plurality of central processing units coupled to the bus; and a plurality of status registers coupled between respective central processing units from the plurality of central processing units and the bus, the plurality of status registers containing status information for the at least one peripheral device coupled to the bus.

4. The computer system of claim 1, wherein the central processing unit includes an instruction that examines the status register and jumps to different interrupt service routines to service different peripheral devices based upon information in the status register.

5. An apparatus within a processor for updating a status register to indicate changes in a status of a plurality of peripheral devices in a computer system, comprising:

a plurality of address inputs coupled to address lines of a bus, the bus being coupled to the plurality of peripheral devices in the computer system;

an address detecting circuit coupled to a set of higher order bits in the plurality of address inputs, for detecting an address in a reserved range of addresses specified by the set of higher order bits; and a decoder circuit coupled to a set of lower order bits in the plurality of address inputs, for detecting references to particular addresses in the reserved range of addresses; and the status register coupled to a set of outputs from the decoder circuit, so that a reference to a particular address in the reserved range of addresses by a peripheral device feeds through the decoder circuit and updates status information for the peripheral device in the status register, the status register including outputs coupled to a central processing unit so that the status register can be read by the central processing unit.

6. The apparatus of claim 5, wherein the address detecting circuit includes a decoder.

7. The apparatus of claim 5, wherein the address detecting circuit includes a comparator.

8. The computer system of claim 5, wherein the processor includes a microprocessor chip.

* * * * *